(12) United States Patent
Tripathi et al.

(10) Patent No.: US 10,621,057 B2
(45) Date of Patent: Apr. 14, 2020

(54) INTELLIGENT REDUNDANT ARRAY OF INDEPENDENT DISKS WITH RESILVERING BEYOND BANDWIDTH OF A SINGLE DRIVE

(71) Applicant: Intelliflash by DDN, Inc., Santa Clara, CA (US)

(72) Inventors: Shailendra Tripathi, Fremont, CA (US); Sreekanth Garigala, Fremont, CA (US); Sandeep Sebe, Fremont, CA (US)

(73) Assignee: INTELLIFLASH BY DDN, INC., Santa Clara, CA (US)

( * ) Notice: Subject to any disclaimer, the term of this patent is extended or adjusted under 35 U.S.C. 154(b) by 78 days.

(21) Appl. No.: 15/887,971

(22) Filed: Feb. 2, 2018

(65) Prior Publication Data

US 2019/0057004 A1 Feb. 21, 2019

Related U.S. Application Data

(63) Continuation-in-part of application No. 15/700,912, filed on Sep. 11, 2017.

(60) Provisional application No. 62/546,114, filed on Aug. 16, 2017.

(51) Int. Cl.
*G06F 11/20* (2006.01)
*G06F 11/10* (2006.01)
*G06F 3/06* (2006.01)
*G06F 12/02* (2006.01)

(52) U.S. Cl.
CPC ........ *G06F 11/2082* (2013.01); *G06F 3/0608* (2013.01); *G06F 3/0619* (2013.01); *G06F 3/0644* (2013.01); *G06F 3/0689* (2013.01); *G06F 11/1088* (2013.01); *G06F 12/0246* (2013.01)

(58) Field of Classification Search
CPC ........................ G06F 11/1088; G06F 11/1092
USPC ........................................................ 714/6.24
See application file for complete search history.

(56) References Cited

U.S. PATENT DOCUMENTS

| 6,182,089 | B1 | 1/2001 | Ganapathy |
| 7,958,304 | B1 | 6/2011 | Goel et al. |
| 9,838,477 | B2 | 12/2017 | Mu et al. |
| 2003/0188101 | A1* | 10/2003 | Fore ...................... G06F 3/0601 711/114 |
| 2003/0220951 | A1 | 11/2003 | Muthulingam et al. |

(Continued)

*Primary Examiner* — Chae M Ko
(74) *Attorney, Agent, or Firm* — David R. Stevens; Stevens Law Group

(57) ABSTRACT

A process for reconstructing data stored on a failed storage drive in a RAID storage system involves performing a resilvering procedure on a first portion of the data for reconstruction and performing a recompaction procedure on the remaining portion of the data for reconstruction. Because the resilvering procedure rebuilds its data only on the replacement storage drive, but the recompaction procedure rebuilds its data on one or more, likely multiple, non-failed storage drives, the additional bandwidth provided by the non-failed drives is utilized to increase the speed of the overall data reconstruction. Determining how much of the data storage chunk processing to distribute to the resilvering and to the recompaction procedures may be based on the respective write workloads of the replacement and non-failed drives, as well as on the percentage of free storage space available from each of the chunks.

20 Claims, 11 Drawing Sheets

(56) References Cited

U.S. PATENT DOCUMENTS

| | | |
|---|---|---|
| 2004/0210731 A1* | 10/2004 | Chatterjee ............. G06F 3/0614 |
| | | 711/165 |
| 2008/0301256 A1 | 12/2008 | McWilliams |
| 2012/0011317 A1* | 1/2012 | Ikeuchi ................ G06F 3/0613 |
| | | 711/114 |
| 2012/0203994 A1* | 8/2012 | Burka ................ G06F 12/0269 |
| | | 711/165 |
| 2013/0073813 A1 | 3/2013 | Bacik |
| 2014/0164730 A1 | 6/2014 | Gold et al. |
| 2014/0279849 A1 | 9/2014 | Zhang et al. |
| 2015/0006846 A1 | 1/2015 | Youngworth |
| 2015/0248402 A1* | 9/2015 | Patterson, III ...... G06F 16/1827 |
| | | 707/640 |
| 2015/0339221 A1 | 11/2015 | Fair |
| 2016/0110121 A1 | 4/2016 | Singh et al. |
| 2017/0206020 A1 | 7/2017 | Brown et al. |
| 2017/0262191 A1 | 9/2017 | Dewakar et al. |
| 2018/0018233 A1* | 1/2018 | Kim ................... G06F 11/1096 |

* cited by examiner

INTELLIGENT REDUNDANT ARRAY OF INDEPENDENT DISKS WITH RESILVERING BEYOND BANDWIDTH OF A SINGLE DRIVE

CROSS-REFERENCE TO RELATED APPLICATION

This application is a continuation-in-part of and claims the benefit of priority of pending U.S. patent application Ser. No. 15/700,912 filed on Sep. 11, 2017, which claims the benefit of priority of U.S. Provisional Patent Application Ser. No. 62/546,114, titled "Intelligent Redundant Array of Independent Disks" filed Aug. 16, 2017, the entire content of all of which is incorporated by reference for all purposes as if fully set forth herein.

BACKGROUND

The ZetaByte File System (ZFS) uses a logging mechanism, the ZFS intent log (ZIL) to store synchronous writes, until they're safely written to the main data structure in the memory storage pool. The speed at which data can be written to the ZIL determines the speed at which synchronous write requests can be serviced: the faster the ZIL, the faster most databases, NFS and other important write operations become. Normally, the ZIL is part of the regular memory pool on storage disk. But ZFS offers the possibility to use a dedicated device for the ZIL. This is then called a "log device".

ZFS also has a sophisticated cache called the "Adaptive Replacement Cache" (ARC) where it stores both most frequently used blocks of data and most recently used ones. The ARC is stored in RAM, so each block of data that is found in the RAM can be delivered quickly to the application, instead of having to fetch it again from disk. When RAM is full, data needs to be thrown out of the cache and is not available any more to accelerate reads.

Solid-state arrays (SSA) have moved the external controller-based storage array market from a relatively stagnant incrementally improving market with slow-changing dynamics to a progressive neoclassical market. Improvements in the dynamics of many factors—such as reduced storage administration, power, cooling, rack space, increased performance and density—have changed the accepted assumptions of the previous SAN storage array market. Many vendors design and develop their own custom solid-state solutions. Consequently, more vendors are offering alternate solid-state media form factors with denser and faster systems when they create their own NAND flash storage packaging. From a whole system perspective, the largest SSAs now scale to 3.9 PB, and next-generation SSD technology and interconnects will again redefine performance capabilities, creating demand for faster storage networks.

Neither the solid-state array, nor the storage array administrator is the bottleneck anymore; but network latency has become the challenge. This has extended the requirement and life span for 16 Gbps and 32 Gbps Fibre Channel SANs, as Ethernet-based networks and related storage protocols struggle to keep up. Many new vendors have entered the market who provide comprehensive service management, and along with many traditional storage vendors, they continue to transition their portfolios from HDD-based arrays to all solid-state arrays.

Therefore, an SSA that is two to three times more expensive to purchase becomes a cost-effective replacement for a hybrid or general-purpose array at increased utilization rates. With regard to performance, one SSD can typically replace multiple HDDs, combined with data reduction features and increased storage administrator productivity the price point at which SSA investment decisions are made is dropping rapidly. Redundant array of independent disks (RAID) rebuild times for high-capacity SSDs are also faster than for high-capacity HDDs. Therefore, as HDD storage capacities increase, so do HDD recovery times, and SSAs reduce the risk exposure during any media failure and recovery window. Use cases for SSAs are moving into analytics, file and object workloads, and some customers even use SSAs as backup targets to reduce backup and restore windows.

Price and ownership programs translate into very competitive purchase prices for buyers, but vendors are faced with challenges to becoming profitable as incumbent vendors discount to avoid losing market share and new vendors discount to attract new customers. Because the SSA market has expanded rapidly with SSD reliability being equal to or better than HDD arrays, and feature parity also equalizing, the competitive battle to differentiate has moved to ease of ownership, and remote and pre-emptive support capabilities.

In contrast to block and file I/O storage systems, when an object is stored in Object addressable data storage systems (OAS), the object is given a name that uniquely identifies it and that also specifies its storage location. This type of data access therefore may eliminate the need for a table index in a metadata store and it may not be necessary to track the location of data in the metadata. An OAS receives and processes access requests via an object identifier that identifies a data unit or other content unit rather than an address that specifies where the data unit is physically or logically stored in the storage system.

In OAS, a content unit may be identified using its object identifier and the object identifier may be independent of both the physical and logical locations where the content unit is stored. In other words, the object identifier does not control where the content unit is logically or physically stored. Thus, if a physical or logical location of a content unit changes, the identifier for access to the unit of content may remain the same. Thus, an application program may simply track the name and/or location of a file rather than tracking the block addresses of each of the blocks on disk that store the content.

Many storage systems have separate systems to de-duplicate and compress data and replication software is often added post system build. Server vendors have used available building blocks to slash server prices dramatically, yet storage incumbents continue to overcharge customers for their storage servers. Architectural complexity, non-integrated products, expensive proprietary networking protocols, cumbersome administration and licensing for every module of software are the norm and burden storage consumers with high prices and high maintenance.

Modern computing ecosystems rely on resilient data availability for most of their functions. This translates directly into failure-resilient storage systems, which have fostered the development of strategies in storage server solutions like clustering (multiple computers per file system), shared storage, and splitting of compute and file-system responsibilities. Simultaneously, the network file-system protocols like CIFS (Common Internet File System) and NFS (Network File System) have undergone modifications that allow applications running on remote clients to receive a seamless flow of data, irrespective of storage node failures at the server. This is primarily achieved by making the storage server cluster guarantee that once a client acquires a handle on a file by opening it, the cluster and not a specific node will honor client interactions for this file-handle. This guarantee has major implications to the manner in which client's file-handle data must be stored on a storage server.

In a traditional storage server, the storage host node, which services the client's request for opening a file, creates an in-memory context for the client's request to open the file and refers to it for all further client operations using the file-handle that it returns to the client as a part of an open response till the client relinquishes the file-handle, typically through a file-close.

This in-memory context, or client's file-handle info, can be grouped into the following categories. Mode of usage: The manner in which the client wishes to use the file, e.g. read, write, execute, delete etc. Mode of shared usage: The manner in which the client allows other clients to use this file concurrently. Locking information: The extent of the file over which the client wishes exclusive access. This state may also contain information about any soft-lock or opportunistic lock that the client holds for caching read and writes to the file locally. Any application specific context that the client wishes to save as opaque metadata for the lifetime of the file-handle.

For a failure-resilient storage system, this in-memory state, referred to as 'persistent-handle-info' or PHDL-info hereafter, must be made available to other nodes of the system, so that in the event of primary node failure, any other node in the storage cluster can serve the data to clients once the latter present their persistent-handles for reconnection. However, storing the persistent-handle-info for long time-intervals can cause considerable memory consumption on the storage server.

Figure 1:
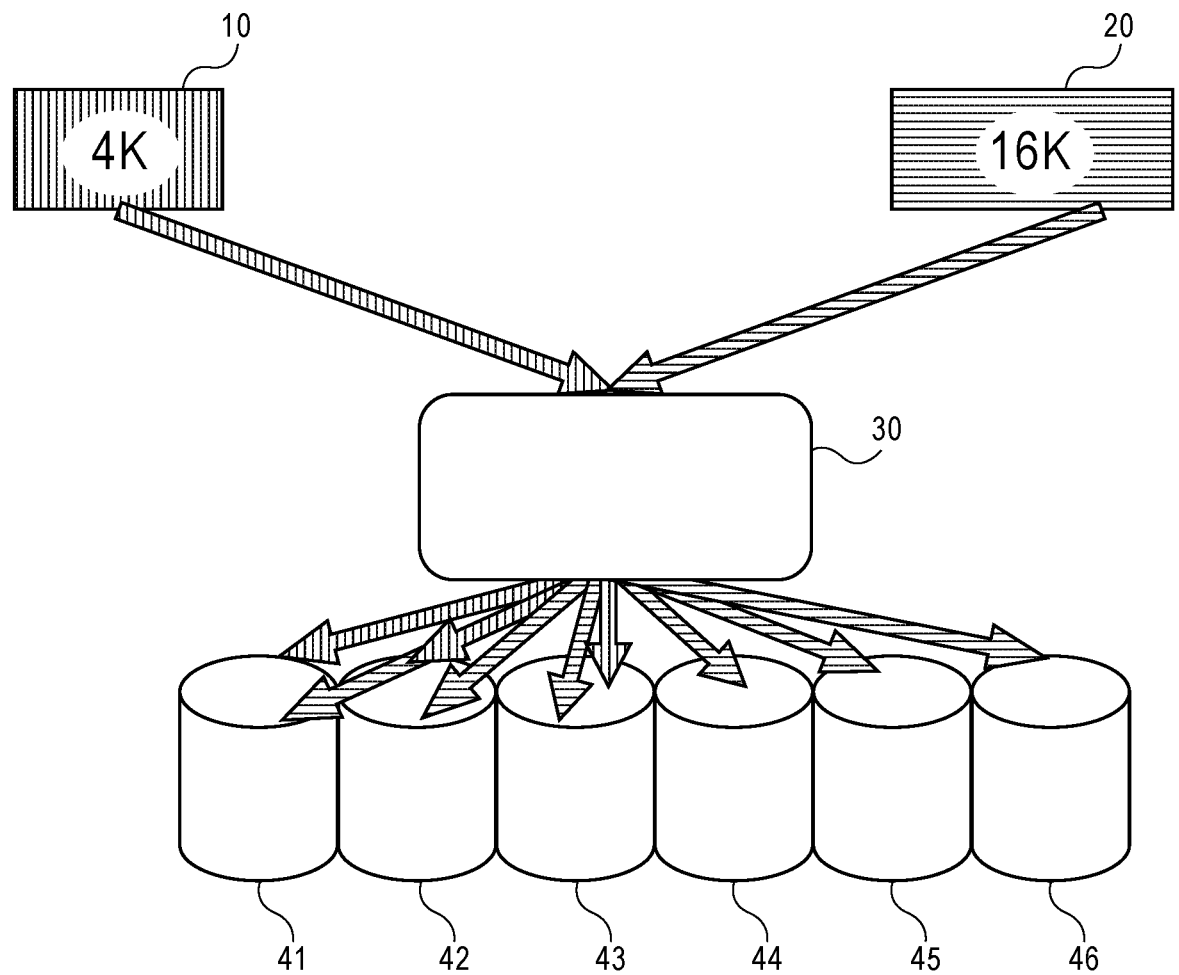
FIG. 1 depicts the dynamic parity working when a device I/O unit size is 4K and 16K and how the devices fan out in the file system disks in accordance with an embodiment of the present disclosure.
Figure 1:
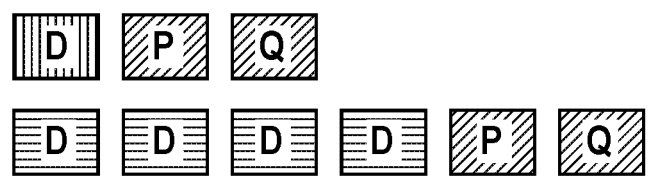

Throughout the description, similar reference numbers may be used to identify similar elements in the several embodiments and drawings. Although specific embodiments of the invention have been illustrated, the invention is not to be limited to the specific forms or arrangements of parts so described and illustrated. The scope of the invention is to be defined by the claims herein and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to one skilled in the relevant art and having possession of this disclosure, are to be considered within the scope of the invention.

Throughout the present disclosure, the term 'resilvering' refers to the process of moving data from one device to another device to remirror, or rebuild a RAID drive set. Also the term 'coalesce' used throughout the disclosure refers to the act of merging two adjacent free blocks of memory.

In regular non-ZFS (ZetaByte File System) RAID (Array Disks), data is always written in full stripe sizes. If the full stripe size is not present during the I/O, it reads the rest of the parts of the stripe from storage and converts it into the full stripe. Thus, every unaligned I/O becomes a read-modify-write operation making the writes, especially sub-stripe size random I/Os read-bound, and hence, poorly performing. ZFS uses dynamic raid striping to avoid doing read/modify write when an I/O size is not aligned to a stripe size. Every I/O is converted into a stripe of dynamic size. This policy alleviates the write bandwidth issue.

In a ZFS, the I/O and the allocations are done at the filesystem block size level granularity. Hence, dynamic parity works very well for writes especially for larger block size I/Os. For small block size I/Os and regular read performance, coupled with I/O unit alignment at much smaller size, it also presents a read-I/O performance scaling issue or storage in-efficiency. The I/O is received at the top level virtual device which represents the RAID device. The device is divided in minimum I/O unit size, and parity columns are added.

I/O and Dynamic Parity

FIG. 1 depicts the dynamic parity working when a device I/O unit size is 4K and 16K and how the devices fan out in the file system disks in accordance with an embodiment of the present disclosure. Two sample I/Os, reference numbers 10 and 20, of 4K and 16K write sizes and how they fan out from device 30 into devices 41:46 are depicted. The exemplary drawing represents how the space consumption gets inflated in the dynamic parity RAID. For small size 4K I/Os, it generates 3 columns of device I/Os 1 for data D, and 2 for RAIDZ2, P, and Q parities. Thus, every 4K I/O consumes 12K of the space. If the majority of the I/Os are small sized, this space inflation becomes a huge bloat and does not follow the standard RAID math for space efficiency.

Space Inflation

Figure 2:
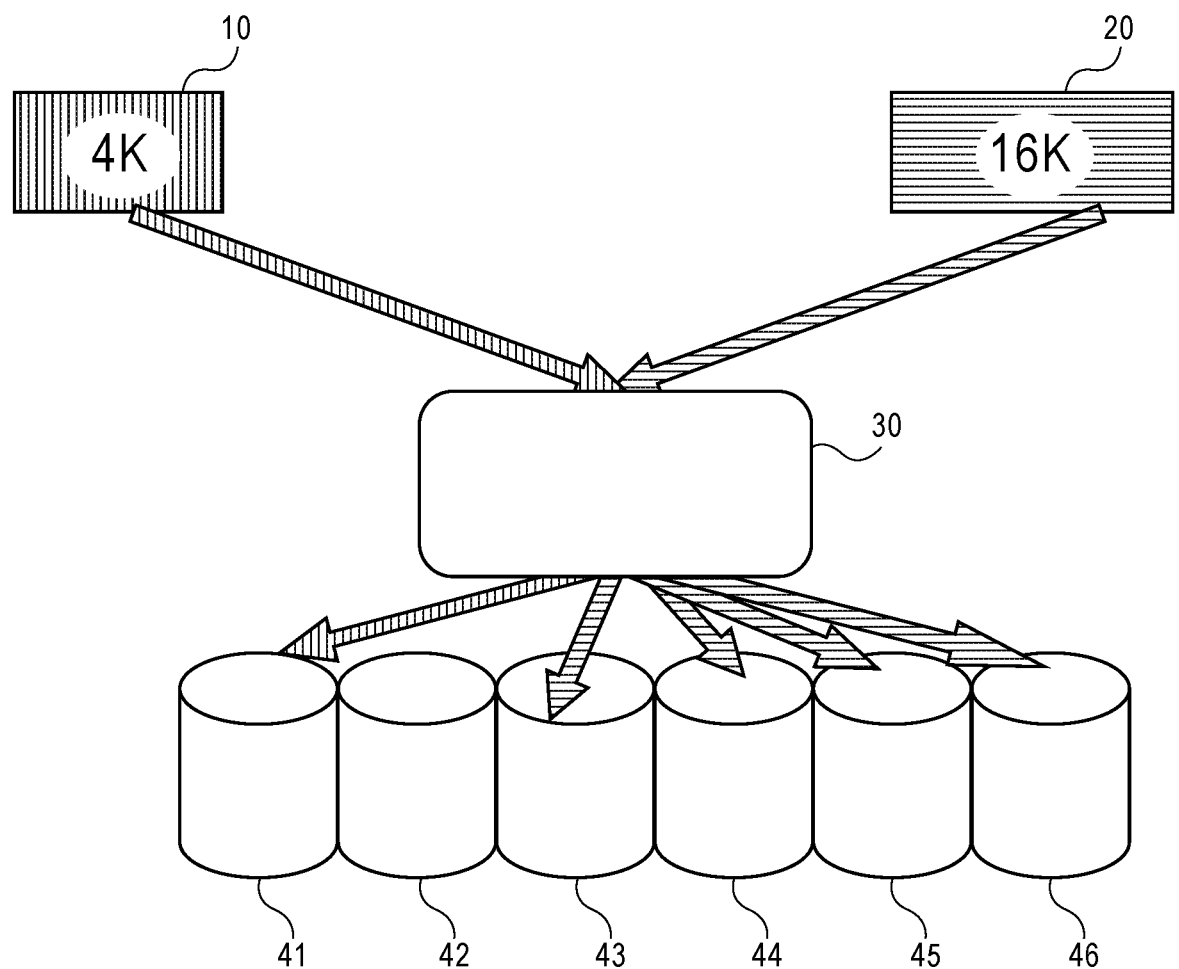
FIG. 2 depicts how read I/Os are served in the dynamic parity RAID using the same 4K and 16K write I/Os done in FIG. 1 in accordance with an embodiment of the present disclosure.

FIG. 2 depicts how Read I/Os are served in the dynamic parity RAID using the same 4K and 16K write I/Os done in FIG. 1 in accordance with an embodiment of the present disclosure. Reference numbers are same for same and or similar components depicted in FIG. 1 described above. From the read I/O, the functional translation provides the device on which the data columns reside. In case of read I/Os, in all healthy device paths, parity columns are not read. As it is evident from the 16K read, that the read is distributed in the device I/O unit sizes. Hence, every such read inflates the I/Os being done on the device. With random read I/Os, the read I/O inflation becomes the performance bottleneck.

Slow Rebuild Resilvering

Figure 3:
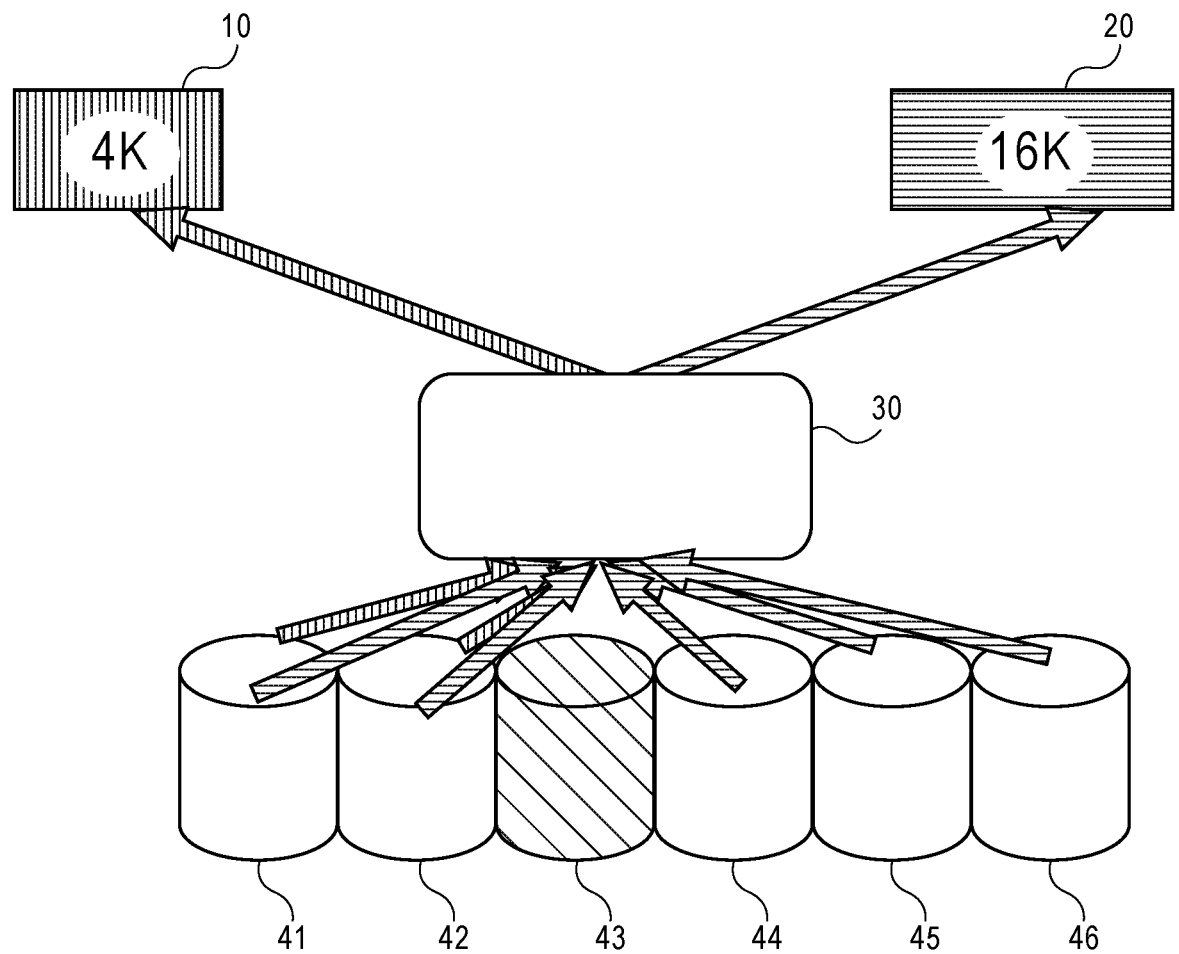
FIG. 3 depicts a resilvering process in RAID done by a Merkel tree walk starting from the root in terms of block pointers in accordance with an embodiment of the present disclosure.

FIG. 3 depicts a resilvering process in RAID done by a Merkel tree walk starting from the root in terms of block pointers in accordance with an embodiment of the present disclosure. Reference numbers are same for same and or similar components depicted in FIG. 1 described above. The block pointer represents the basic I/O unit from logical FS perspective. Using the running example of 4K and 16K I/Os, the depicted diagram represents what happens during resilvering when a device fails. As depicted, for every logical FS unit, the read is issued for all the columns present in healthy devices. During this process, the read I/Os are issued in device I/O unit terms, inflating the total reads being issued on the devices. This quickly becomes the read-bound I/O bottleneck performing very poorly. As also depicted in FIG. 3, the basic problem arises from small sized I/Os being serviced on the end-devices.

Intelli-RAID Design

The disclosed Intelli-RAID(i-RAID) retains the dynamic parity and addressed the small I/O issue. The core idea is to coalesce the small writes in reasonably sized chunks (upto 1 MB chunk). Such end-devices don't get any small size I/Os. A new mapping layer, a chunk map header indexing, is created to map the small-sized chunks in the coalesced chunks. When the chunk-size is coalesced or when the consistency check point is hit (spa [storage pool allocator] sync in ZFS terms), it flushes the chunks by allocating large chunks. The dynamic parity algorithm is applied on the coalesced chunk which generates the parities and data fragment columns in reasonably big sized chunks. An appropriate chunk header is created to maintain the mapping.

Figure 4:
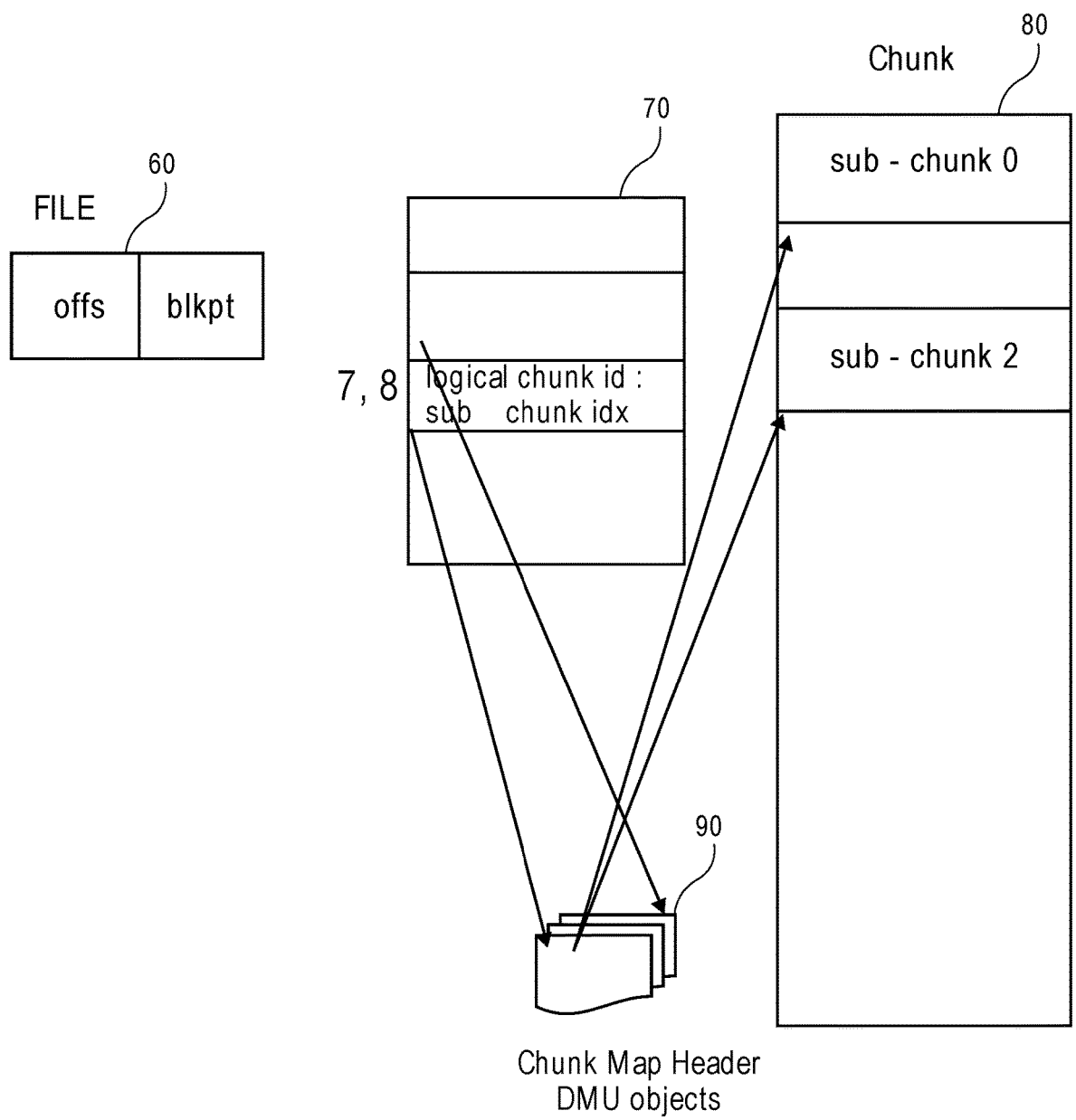
FIG. 4 is a block diagram of fixed size chunks assembled in contiguous data vectors in relation to the header and metadata for the data array in accordance with an embodiment of the present disclosure.

FIG. 4 depicts the access flow in accordance with an embodiment of the present disclosure. The regular block pointer (blkptr_t) used in directories and files 60, now point to a logical chunk ID 70 and the offset in the chunk in the DVA fields of the blkptrs. The DVA fields also contain a bit indicating the block pointer is of chunk type. This allows the chunked blkptr_t and regular blkptr_t to co-exist in dual process threads. During the read flow, the blkptr will read the embedded chunkid to first read the chunk header 90 by looking up the header index object maintained for every chunk id. From the chunk-header, and, sub-chunkid 80, it finds out the mapping on the end-devices.

Each Chunk Map Header is a 4K size structure which describes the details about the chunk. It maintains a unique logical chunk id, data checksum, data protection type (RAID types for now), and an array of sub-chunk headers. Each sub-chunk is identified uniquely by an 8 byte field which includes the chunk ID (54 bits) and the 10 bit sub-chunk count ID.

Chunk ID Management

Figure 5:
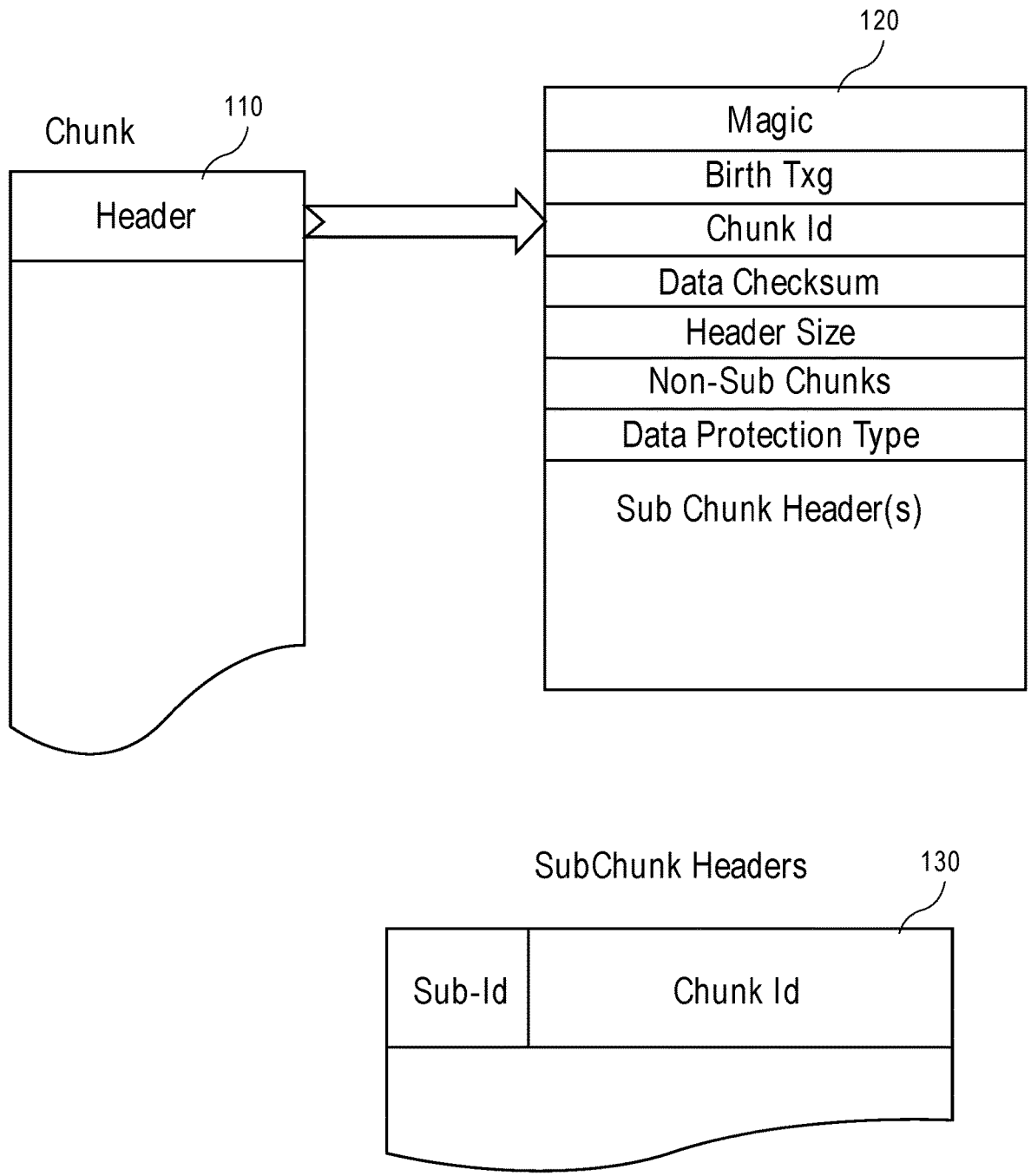
FIG. 5 depicts a Chunk map header as a 4K size data entry in accordance with an embodiment of the present disclosure.

FIG. 5 depicts a Chunk map header as a 4K size data entry in accordance with an embodiment of the present disclosure. These headers 110 are stored in an object (like a regular file object) 120. For parallelism and better scaling, a fixed number of multiple such objects are maintained for a pool. Unique Chunk Id 130 is generated by combining the offset of the chunk-map logical offset location with the logical DMU object-Id. The top few bits of the Chunk-Id identify the dmu object while the rest of the Chunk id bits represent the logical block id in 4 k block units. This simplifies the chunk-id generation which becomes automatically extensible, and, dynamic, and, physically indexed via radix tree lookup. The data in these objects are always appended and, hence, a radix tree remains optimal to the growth of the object as the radix tree spa is very compact.

The header depicted comprises a magic field, a birth transaction (txg) field, a chunk ID field, a data checksum field, a header size field, a num-sub chunks field, a data protection type field and a sub chunk header(s) field. The SubChunk Headers comprise a sub-id and a chunk ID field.

Write Flow

The data chunks and metadata chunks are coalesced separately. This design allows flexible and dynamic Quality of Service enforcement by the data type. The chunk size, placement, and, servicing can get different service classes to achieve the optimal performance for the pool.

The transaction path remains unchanged in the new design. It is the actual data sync phase (called spa sync) which is intercepted. The small-writes are queued in memory data or meta chunk as appropriate. When the chunk fills up, the chunk flush is initiated asynchronously. At this time, the allocator is consulted to find out the most optimal chunk-size for device configuration (dynamically done for every chunk). All the sub-chunks getting queued to the chunk create the logical block pointer with the DVA (disk virtual address) information from the chunk allocation information.

Before spa sync finishes, any partial sub-chunk is flushed and persisted on the backend. This scheme can be enhanced later by utilizing the NVRAM for staging and writing it when the chunk fills up as an optimization.

Read Flow

When a chunked blkptr is accessed, the chunk bit in the DVA grid field is looked up. If it points to the chunk id, the chunk map—header is lookup up by the ChunkId. The chunk map header points to the back-end location where the data is stored.

Resilvering

The regular resilvering design has been redesigned to utilize the new design to derive the maximum benefit of the chunked RAIDs. When resilvering kicks in, the chunk map walk is done first. The chunk map walks is by the logical offset order, and, in full chunk sizes, thus providing both temporal locality and big I/O advantage while resilvering. During this phase of the resilvering, the underlying devices are bandwidth bound resulting in the very optimal resilvering performance. After chunk walk is finished, the regular walk starts. During this walk, chunked block pointers are skipped.

Free Operation and Re-compaction

Figure 6:
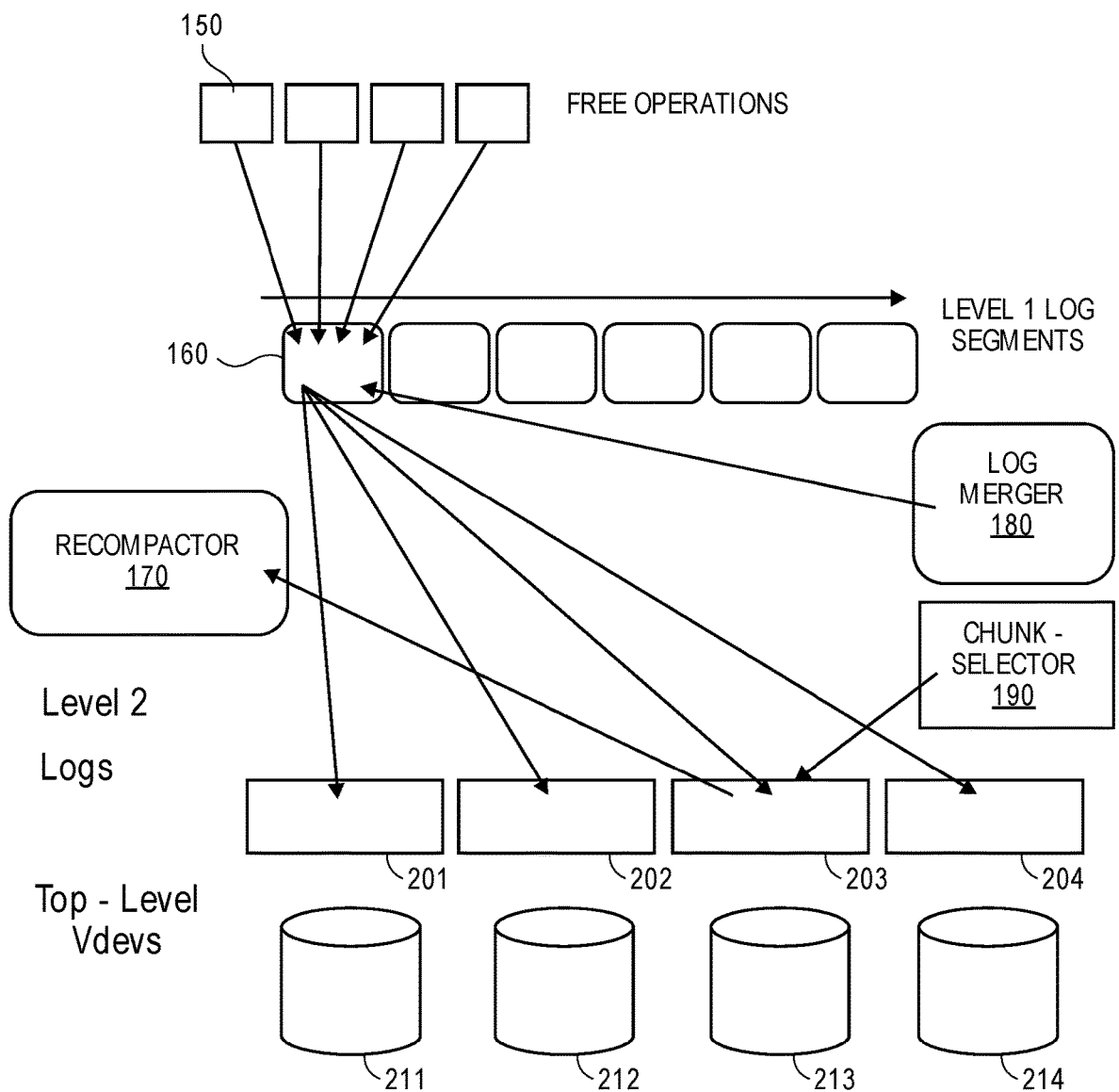
FIG. 6 depicts a free operation and recompaction in accordance with an embodiment of the present disclosure.

FIG. 6 depicts a free operation and recompaction in accordance with an embodiment of the present disclosure. Free is the most complex operation in the new design because one sub-chunk free 150 cannot be freed underneath especially if it is RAID data protection. The parity computation, rebuild and error handling must be done in full chunks. This will create a scenario where deletion operation does not free any chunk as all the frees are scattered. To generate free space in this case, an operation called recompaction is done. During recompaction operation, the chunks with maximum sub-chunks frees are discovered, their data is re-written in a new chunk, and, the old chunk is then freed, making space available.

When the blkptr is deleted, a deletion log is inserted in the space_map_free_chunk log with chunk id and stream id information. This log called L1 log 160 is serially appended and processed when space and/or memory thresholds meet. This L1 log 160 is merged by log merger 180 and the chunk selector 190 into dva offset indexed L2 logs. These L2 logs 201:204 are used later by the recompacter module 170 to find the eligible chunk for recompaction. Top level virtual devices 211:214 may serve as end devices.

Recompaction

When the chunk usage falls below certain threshold or the space usage falls below certain levels, the recompaction process is initiated. Alternatively, when log size becomes very large, the log is processed. The chunks with enough freeable space are recompacted. More details will follow on this.

Figure 7:
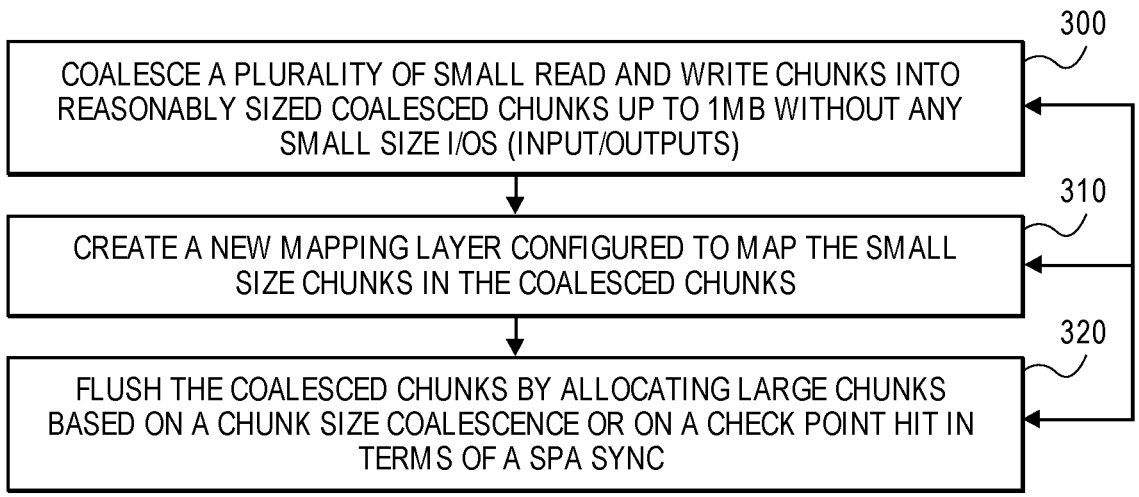
FIG. 7 is a flow chart of in accordance with an embodiment of the present disclosure.

FIG. 7 is a flow chart of a method for managing a RAID file system memory in accordance with an embodiment of the present disclosure. The disclosed method comprises 300 coalescing a plurality of small read and write chunks into reasonably sized coalesced chunks upto 1 MB without any small size I/Os (input/outputs). The method also comprises 310 creating a new mapping layer configured to map the small size chunks in the coalesced chunks. The method additionally comprises 320 flushing the coalesced chunks by allocating large chunks based on a chunk size coalescence or on a check point hit in terms of a SPA Sync.

Figure 8:
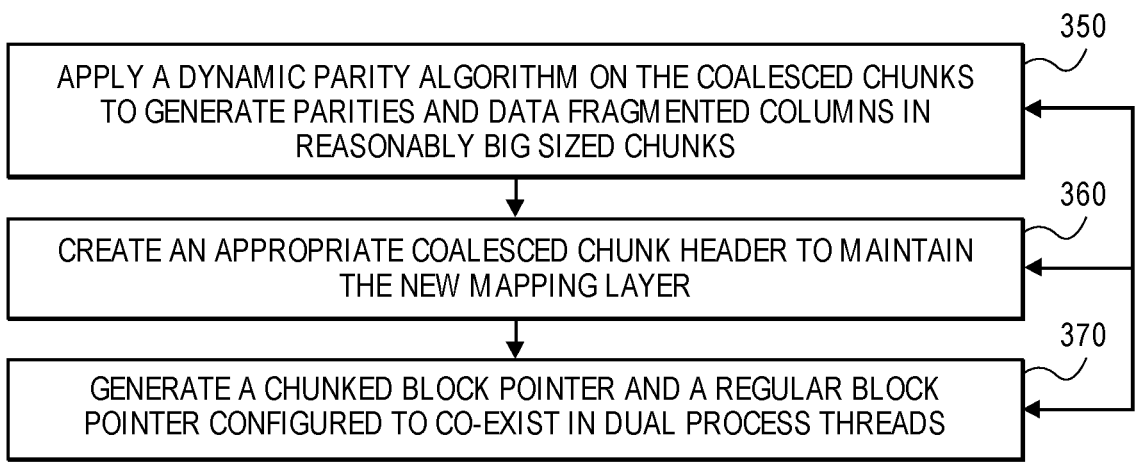
FIG. 8 is another flow chart of a method for intelligent management of a RAID file system memory in accordance with an embodiment of the present disclosure.

FIG. 8 is a flow chart of another method for managing a RAID file system memory in accordance with an embodiment of the present disclosure. The method may also further comprise 350 applying a dynamic parity algorithm on the coalesced chunks to generate parities and data fragmented columns in reasonably big sized chunks. The method may yet comprise 360 creating an appropriate coalesced chunk header to maintain the new mapping layer. The method may still comprise 370 generating a chunked block pointer and a regular block pointer configured to co-exist in dual process threads.

Figure 9:
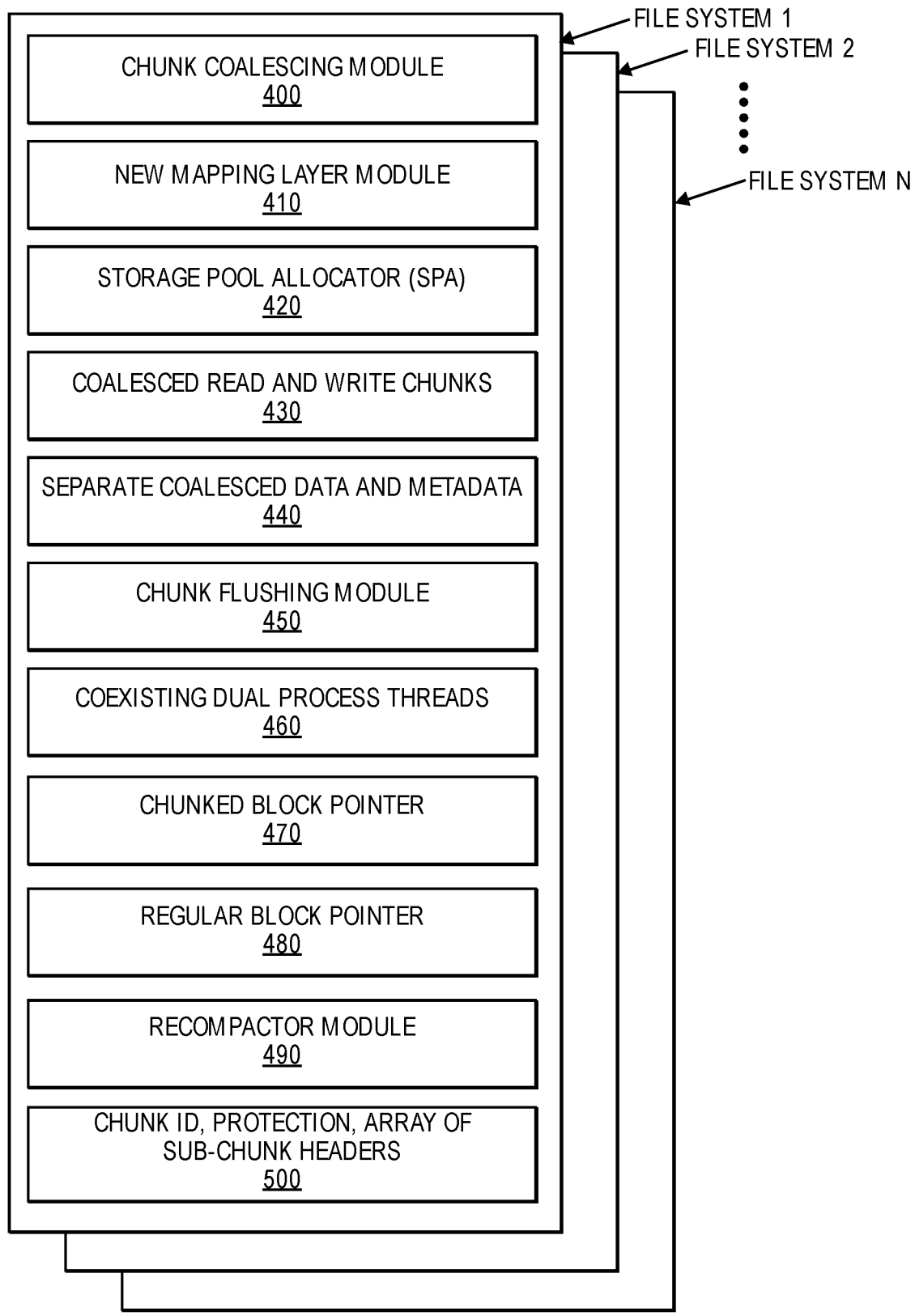
FIG. 9 is a block diagram of components of a system configured to manage a RAID file system memory in accordance with an embodiment of the present disclosure.

FIG. 9 is a block diagram of components of a system configured to manage a RAID file system memory in accordance with an embodiment of the present disclosure. The system disclosed comprises a chunk coalescing module 400 configured to coalesce small read and write chunks into reasonably sized coalesced chunks upto 1 MB without any small size I/Os (input/outputs). The system also includes a new mapping layer module 410 configured to map the small size chunks in the coalesced chunks. The system also includes a storage pool allocation module 420. Coalesced read and write data 430 and separate coalesced data and metadata 440 are also included. The system additionally includes a flushing module 450 configured to flush the chunks by allocating large chunks based on a chunk size coalescence or on a check point hit in terms of a SPA Sync. The system may further comprise a chunked block pointer 470 and a regular block pointer 480 configured to co-exist in dual process threads 460. The system may still comprise a recompactor module 490 configured to identify chunks with a maximum sub-chunks free and to rewrite their data in a new chunk and free the old chunk to make space available.

The coalesced chunks may comprise a unique logical chunk ID, a data checksum, a data protection type and an array of sub-chunk headers 500.

Identifying Eligible Chunks for Recompaction in Constant Time

INTRODUCTION

A copy-on-write file system, such as ZFS, never writes in-place. This mechanism inherently fragments storage as every overwrite ends up in equal size free. These free operations may be completely random. Hence, over time, the fragmentation keeps increasing. After a certain time, it is not possible to find a contiguous fragment, especially of large size. To alleviate this, the ZFS has a gang block mechanism that splits the I/O in smaller pieces for larger blocks. However, this is computationally expensive because as the space fills up, I/O using such gang blocks becomes inherently expensive. Hence, large block I/O performance on aged pools performs very poorly. The mechanism referred to as recompaction addresses this fragmentation challenge.

Recompaction efficiency becomes a key distinguishing mechanism. Because the recompaction process reads and writes the data, it is bandwidth bound. However, the bandwidth is sufficiently available in most practical configurations used with hard disk drives (HDDs) or solid-state drives (SSDs). Hence, the mechanism to find which chunk to recompact becomes a critical function in providing the sustained overall performance.

There are a number of possible approaches for implementing a chunk free process, some examples of which follow.

(a) When free storage space becomes available, move the rest of the chunks together and update the header map. This approach is not considered to scale well.

(b) When free storage becomes available, update a bit in the chunk map representing the chunk that is freed. During recompaction process, sequentially scan all the chunkmap headers and find the chunks that are eligible for recompaction. This approach is non-deterministic because finding an eligible chunk(s) can take a significantly long time. Additionally, updating the bitmap for every free does not scale as the deletions are mostly random and such inflation hits the bandwidth limit soon.

(c) The mechanism described in (b) can be improved by keeping chunks information sorted in memory with the free bitmap. This eliminates the need to find the eligible chunks but it does not likely scale on even modest sized storage systems as the memory needed to keep this in-core grows linearly and, therefore, this approach cannot be used in most practical systems. Additionally, it does not address the bandwidth inflation due to small free operations on the chunk map headers.

(d) The free bitmap approach described in (c) can be enhanced by placing the bitmap in persistent storage and, thus, allowing the memory problem to be addressed. However, this approach creates a new index structure that must be made consistent. While this approach may solve the problem of finding eligible free storage, it has a significantly high update cost. In reasonably sized system, this indexing performance likely becomes the limiting factor.

The free and subsequent processing is typically one of the most complex operations in any file system, and is highly taxing on the storage resources. Because with copy-on-write file systems every overwrite operation is essentially a free operation as well, the free operation is as common an operation as write. This makes the sustained file system performance effectively equally dependent on free processing performance as it is on write processing performance. Since the namespace free operation may not point to the device DVAs (disk virtual address) directly, the free operation will not end up in a real free at the allocator level. To be able to free actual physical space, all the subchunks of a chunk must also be freed. This is not possible all the time due to different life spans of the participating subchunks. Hence, an additional mechanism is needed which relocates the unused data and allows the original data to be freed.

Recompaction Processes and Mechanisms

Figure 10:
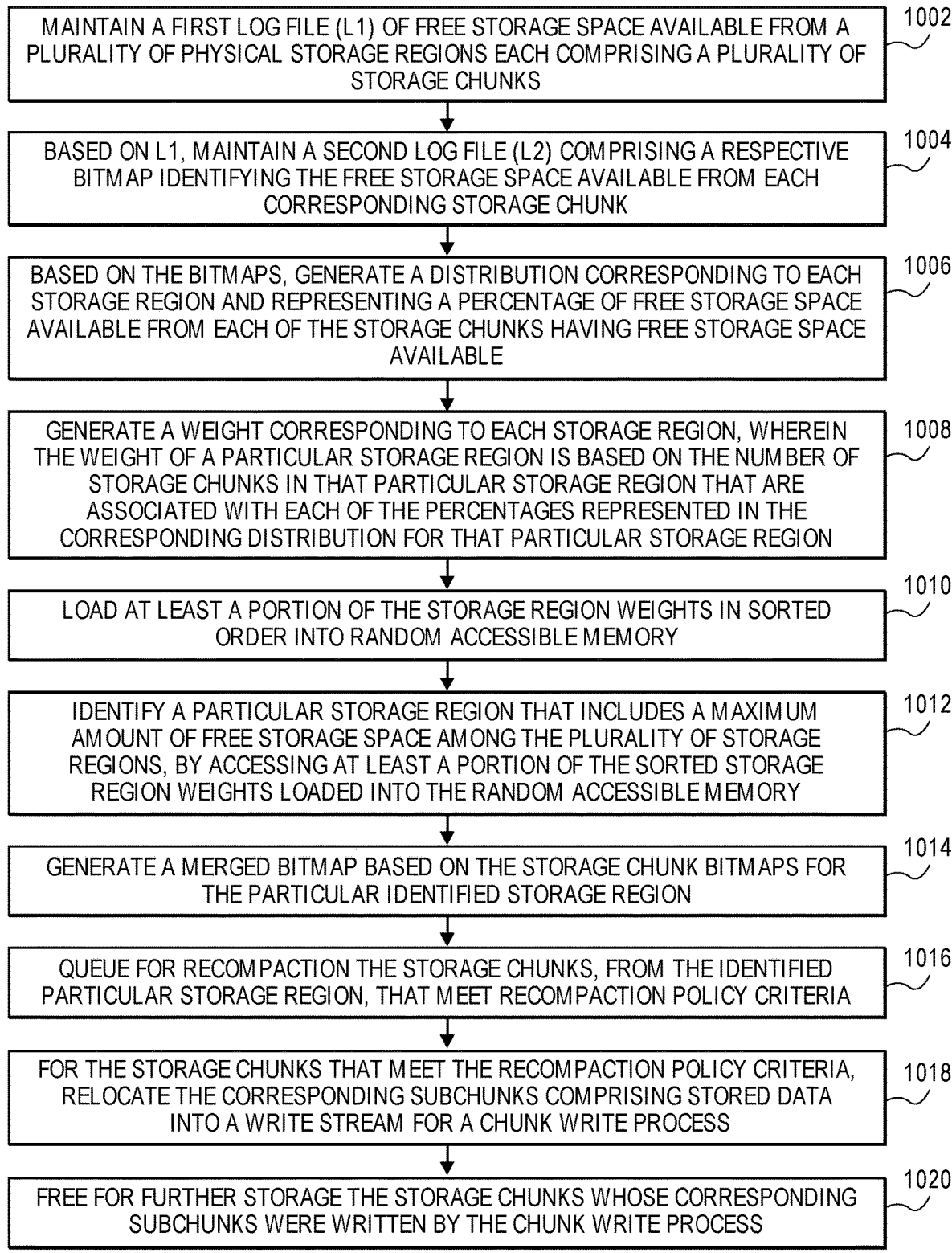
FIG. 10 is a flow diagram illustrating a method of recompacting digital storage space in accordance with an embodiment of the present disclosure.
Figure 11:
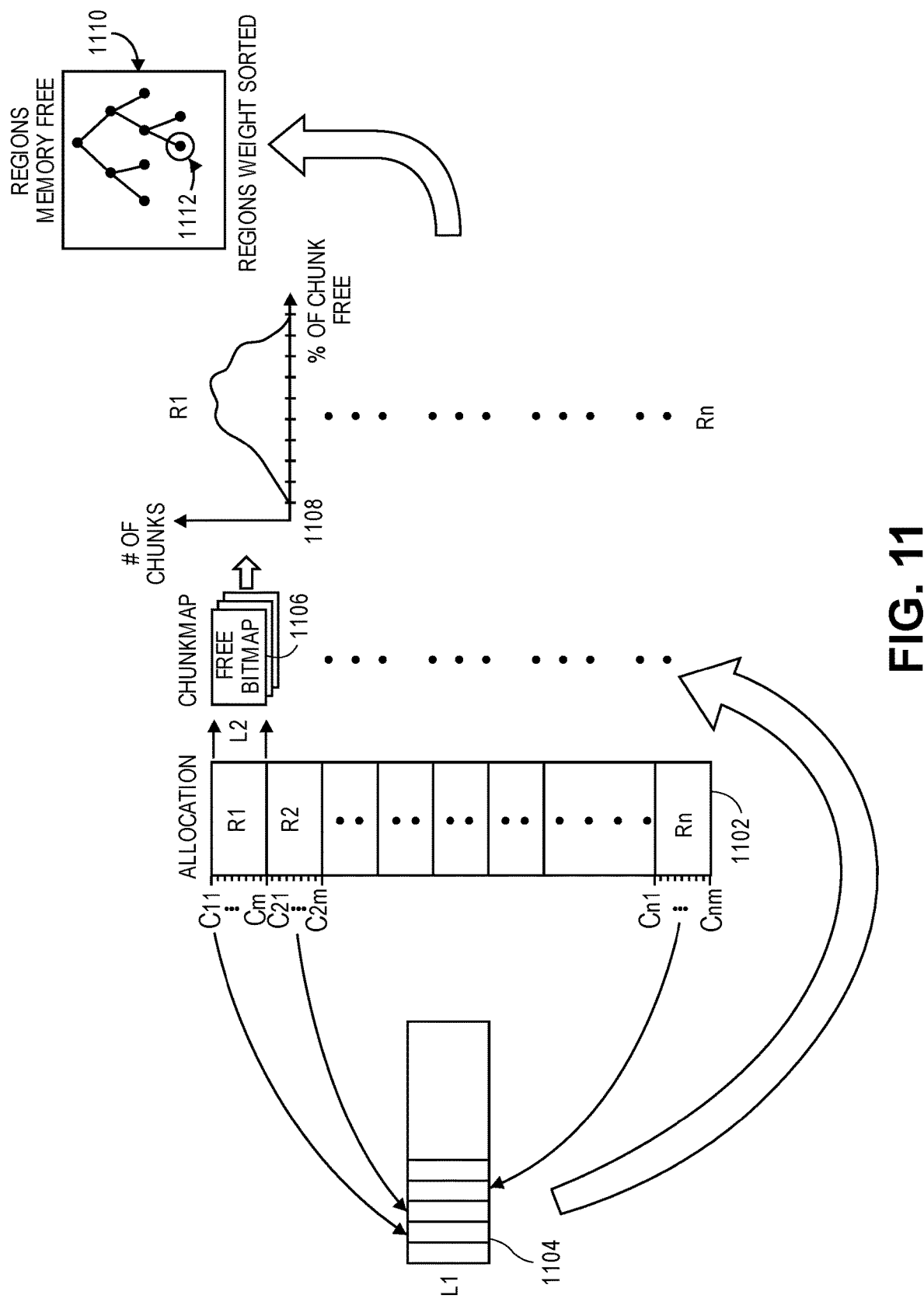
FIG. 11 is a block diagram illustrating data mechanisms for continuously identifying chunks having maximum free space in accordance with an embodiment of the present disclosure.

FIG. 10 is a flow diagram illustrating a method of recompacting digital storage space in accordance with an embodiment of the present disclosure. FIG. 11 is a block diagram illustrating data mechanisms for continuously identifying chunks having maximum free space in accordance with an embodiment of the present disclosure. The method illustrated in FIG. 10 is described hereafter with reference to the data mechanisms of FIG. 11. Such a recompaction process may be triggered by various scenarios or events, such as when the level of available system storage falls below a certain threshold.

With reference to FIG. 10, at block 1002 a log file (L1) of free storage space available from a plurality of physical storage regions, each comprising a plurality of storage chunks, is maintained. There is no limit intended for the type of storage that may be managed with the embodiments described herein, for example, the described techniques may be implemented for non-volatile memory or storage including solid state memory and/or hard disk drive storage. For example and with reference to FIG. 11, a first log (L1) 1104 is maintained, comprising appended entries identifying free (unused) storage space available from multiple storage regions R1-Rn of a storage allocation pool 1102, where each storage region R1-Rn is associated with multiple storage chunks Cnm (e.g., storage region R1 comprises associated chunks C11-C1m; storage region R2 comprises associated chunks C21-C2m; . . . storage region Rn comprises associated chunks Cn1-Cnm).

According to an embodiment, each log entry of L1 1104 comprises a storage chunk ID and corresponding subchunk IDs associated with a respective storage chunk Cnm having free storage space available. According to an embodiment, the logical address space of the available free storage space from a respective storage chunk Cnm is determinable from the storage chunk ID and corresponding subchunk IDs. Hence, the L1 1104 represents the chunk logical address space, e.g., a "chunkmap".

At block 1004 of FIG. 10, based on the first log, a second log file is generated and maintained comprising a respective bitmap identifying the free storage space available from each corresponding storage chunk. For example and with reference to FIG. 11, based on the first L1 log 1104, a second log (L2) 1106 is generated and maintained comprising a respective appended bitmap identifying the free storage space available from each one or more corresponding storage chunk Cnm of a given storage region Rn. According to an embodiment, generating and maintaining L2 log 1106 (at block 1004) comprises sorting L1 log 1104 entries by their physical addresses, coalescing L1 log 1104 entries for each one or more storage chunk Cnm, and generating the respective free bitmap for each storage chunk Cnm based on the coalesced L1 log 1104 entries. For example, the sorting, coalescing, and generating bitmaps may commence when L1 log 1104 and/or L2 log 1006 reach certain size threshold(s). Hence each L2 log 1106 represents an allocation address space range, i.e., identifying the actual free physical space for a given storage chunk. When a chunk is recompacted by way of the recompaction process, an entry in an exception map is created which maps the old chunk ID to a new chunk location. Furthermore, the L1 log 1104 to L2 log 1106 procedure captures all the free operations on the chunks and keeps them coalesced, which eliminates the need to do any chunkmap header update. Still further, according to an embodiment both the L1 log 1104 and the L2 log 1106 are sequentially appended in every spa sync cycle, thus minimizing I/Os.

At block 1006 of FIG. 10, based on the bitmaps (e.g., generated at block 1004), a statistical distribution is generated and maintained corresponding to each one or more storage region and representing a percentage of free storage space available from each of the storage chunks having free storage space available. For example and with reference to FIG. 11, based on the bitmaps associated with L2 log 1106, a statistical distribution 1108 is generated and maintained corresponding to each one or more storage region Rn and representing a percentage (%) of free storage space available from each of the corresponding one or more storage chunks Cnm that have free storage space available (e.g., % of chunk free by # of chunks). Hence, each L2 log 1106 accumulates the total free storage space from the storage region Rn that is mapped in a given L2 log 1106.

At block 1008 of FIG. 10, a weight corresponding to each storage region is generated, where the weight of a particular storage region is based on the number of storage chunks in that particular storage region that are associated with each of the percentages represented in the corresponding distribution for that particular storage region. For example and with reference to FIG. 11, a weight corresponding to each storage region Rn is generated from its corresponding distribution 1108, where the weight of a particular storage region Rn is based on the number of storage chunks in that particular storage region Rn that are associated with each of the percentages represented in the corresponding distribution 1108 for that particular storage region Rn.

At block 1010 of FIG. 10 and according to an embodiment, at least a portion of the storage region weights generated at block 1008, in sorted order, are loaded into memory such as random access memory (RAM). For example, a memory tree 1110 (for a non-limiting example, a binary search tree or "b-tree") representing the storage region Rn weights in sorted order is loaded into memory. Hence, the L2 log 1106 serves as the basis for the recompaction operation. That is, at block 1012 and according to an embodiment, by accessing at least a portion of the sorted storage region weights loaded into RAM, i.e., the memory tree 1110, a particular storage region Rn is identified (e.g., node 1112) that includes the maximum amount of free storage space among the plurality of storage regions.

According to an embodiment, at block 1014 the recompaction engine selects the L2 log 1106 with the highest weight (i.e., the L2 log 1106 corresponding to the storage region Rn corresponding to the node 1112 of the memory tree 1110), and brings all the entries of the L2 log 1106 in memory and creates a merged bitmap based on the storage chunk Cnm bitmaps for the particular identified storage region Rn, for a complete view of the free bitmap. According to an embodiment, the entries of the L2 log 1106 for an unloaded (not yet in RAM) storage region may be scheduled for loading into RAM in parallel with the block 1014 operation. Therefore, according to an embodiment, the entries from multiple L2 logs 1106 may be kept in memory at any given time, e.g., the L2 log 1106 entries for two or more storage regions Rn having the largest and the next largest amounts of free space available. Since load and unload can take some time, the loaded and unloaded tree approach provides effective pipelining to hide any load cost by choosing an appropriate number of loaded L2 logs 1106. Even in a worst case, if an L2 log 1106 needs to be loaded into memory, the log size is bounded by the fixed corresponding storage region size and maximum possible entries. Hence, time to load is predictable, and by appropriately aligning the recompaction rate, this load also can be absorbed.

According to an embodiment, at block 1016 all the storage chunks Cnm corresponding to the particular identified storage region Rn, and which meet recompaction policy criteria, are queued for recompaction and processed asynchronously in the background. According to an embodiment, at block 1018 the recompaction process relocates the live subchunks together into a regular write stream, triggering a regular chunk write process. At block 1020, after the successful write at the new location, the old storage chunk Cnm is freed for further storage. Note that the storage region Rn having the maximum amount of free storage space available is not necessarily or always the region selected from the memory tree 1110 for recompaction at any given time, as the write process may identify and select a storage region Rn for recompaction based on (e.g., to match with) the size of a given write operation.

Regarding data integrity in the context of the recompaction process, ZFS maintains the checksum information in the block pointer embedded in the parent namespace. However, recompaction is performed directly at the chunk level. As recompaction reads all the used data of the chunk from storage, it is important to verify the integrity of the data before writing it out at the new location. Since the checksum information maintained in the namespace is not reachable easily at the allocator level, according to an embodiment, 4-byte CRC checksum per subchunk is maintained in a chunkmap header shadow page. This is in addition to the checksum maintained for the whole chunk. The recompaction process makes intelligent decisions to read the whole chunk or partial subchunks as appropriate in the context, thus providing a flexible approach to the data integrity check and minimizing the read during background operations.

According to embodiments the foregoing recompaction techniques are preferably performed on a continuous, substantially constant basis. Based on these described dynamic techniques, the storage space (and data, in units of a chunk) that can be compacted quickly and efficiently, thus minimizing latency, is readily (i.e., in "constant time") and quickly identifiable. Stated otherwise, identifying in the least amount of time the storage region(s) and corresponding storage chunks having the maximum amount of free storage space available is enabled. Thus, overall system performance is more predictable.

Resilvering Beyond the Bandwidth of a Single Drive

Introduction

When a device fails in any RAID5/6/7 groups, a painstakingly long process called resilvering is performed to ensure the replacement device gets the data columns of the failed device. During this process, the system performance is degraded and the memory/storage pool is at risk of losing data. Hence, finishing the resilvering very fast can reduce the window of such risk exposure.

According to embodiments, when a device change happens due to either failure or replacement, the data on the failed device may be resilvered as follows. The objects are scanned in the logical time ordered recursive tree walk. All the objects within the time range and falling on the failed device are resilvered sequentially by processing the chunks first by walking the chunk map header objects. The chunk map headers represent large sequential objects. When the walk starts, the chunk map objects are scanned first. With chunks, the metadata is scanned and the data is scanned subsequently. Later, if a chunked block is detected, it is not picked up for resilvering. Chunk walks generate a significant sequential workload but scale well to device bandwidth limits.

The foregoing approach to resilvering is much faster than other known approaches to resilvering because of the sequential I/Os generated with the large size chunks. However, the speed is still bounded by the bandwidth of the device ("replacement device") replacing the failed device because, while the read operations are issued to the other devices on which relevant data is stored, the data is still written only to the replacement device. For example, in a pool of hard disk drives, the typical device bandwidth may be in a range around 150-200 MB/s. If the device storage size is relatively large, this still implies a significant time to finish the resilvering. A RAID group comprises multiple drives ranging anywhere from 5 to 20 drives in a typical configuration. Thus, if the resilvering data that needs to be written can be spread onto all the drives, the available write bandwidth is an order of magnitude higher. For example, in a RAID storage system comprising 12 drives, the resilvering speed can be up to 1800-2400 MB/s.

High Bandwidth Resilvering Process

Figure 12:
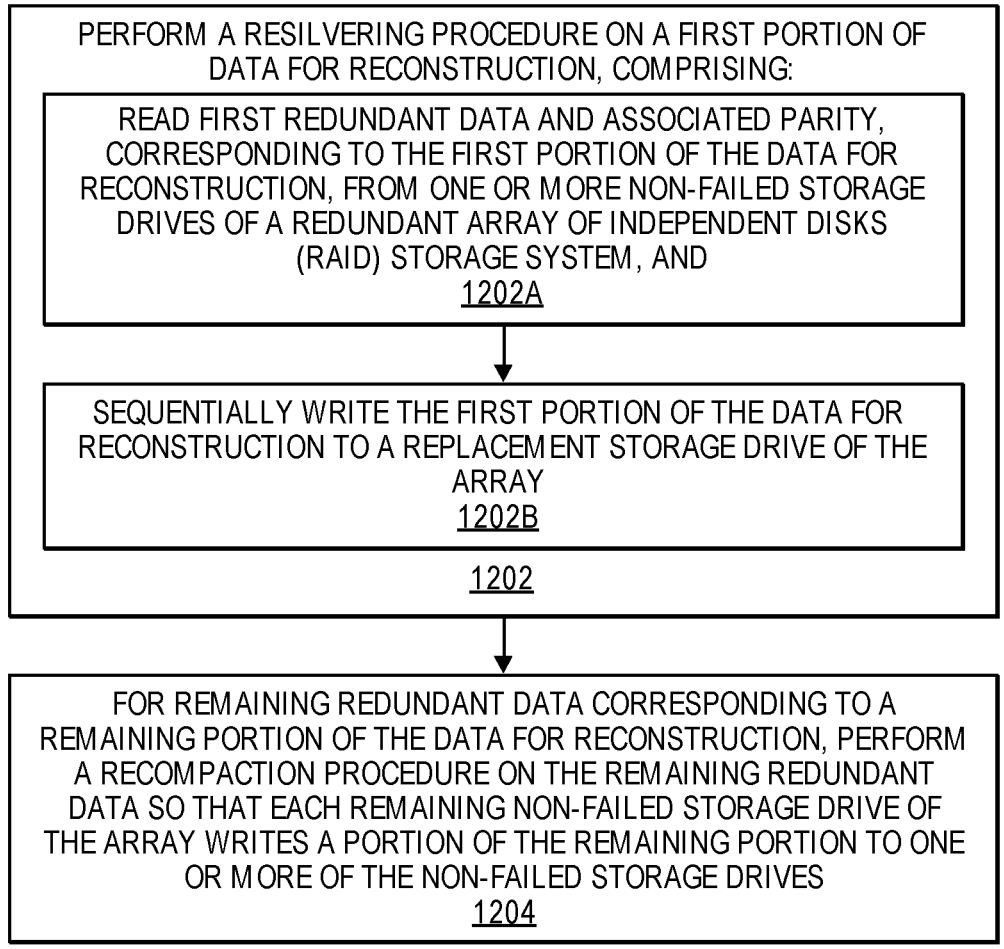
FIG. 12 is a flow diagram illustrating a method of reconstructing data stored on a failed storage drive in a redundant array of independent disks (RAID) storage system in accordance with an embodiment of the present disclosure.

FIG. 12 is a flow diagram illustrating a method of reconstructing data stored on a failed storage drive in a redundant array of independent disks (RAID) storage system in accordance with an embodiment of the present disclosure. Such a method may be implemented for performance by at least one electronic processing circuit, executing one or more sequences of instructions stored on a non-transitory processor-readable medium. This method enables the resilvering speed to surpass the device bandwidth limit, as the recompaction procedure described herein is utilized to spread the write bandwidth on all the drives of the RAID storage pool.

At block 1202, a resilvering procedure is performed on a first portion of the data for reconstruction. At sub-block 1202*a*, first redundant data (e.g., and associated parity), which corresponds to the first portion of the data for reconstruction, is read from one or more non-failed storage drives of the RAID array. At sub-block 1202*b*, the first portion of the data for reconstruction is sequentially written to a replacement storage drive(s) of the RAID array. For example, the aforementioned approach to resilvering may be applied to a portion of the data for reconstruction.

At block 1204, for the remaining redundant data and associated parity corresponding to a remaining portion of the data for reconstruction, a recompaction procedure is performed on the remaining redundant data so that each remaining non-failed storage drive of the array writes a portion of the remaining portion to one or more of the non-failed storage drives. For example, performance of the recompaction process of block 1204 may utilize the data mechanisms of FIG. 11, such as the statistical distribution 1108 (FIG. 11) generated and maintained (e.g., at block 1006 of FIG. 10)

corresponding to each one or more storage region and representing a percentage of free storage space available from each of the storage chunks having free storage space available, and at least portions of the method of FIG. 10, in order to perform recompaction of some of the data for reconstruction.

According to an embodiment, the resilvering procedure of block 1202 and the recompaction procedure of 1204 are performed in parallel. Further, according to an embodiment, performing the recompaction procedure of block 1204 includes each remaining non-failed storage drive writing its portion of the remaining portion in parallel with the other remaining non-failed storage drives. Still further, according to an embodiment, performing the recompaction procedure of block 1204 may include each remaining non-failed storage drive writing/relocating its portion of the remaining portion to itself.

According to an embodiment, whether to rely solely on the resilvering procedure or to rely additionally on the recompacation procedure in the context of the data reconstruction process is based on the data that needs to be written to the replacement storage drive and the total throughput that can be achieved. For example, if the data that needs to be written is relatively small (e.g., because of freeing of some of the subchunks on the failed storage drive), the resilvering procedure alone may be utilized. On the other hand, if the write operations required to the non-failed storage drives can achieve more overall bandwidth, then the recompaction procedure may be utilized in conjunction with the resilvering procedure.

Recall that recompaction reclaims free storage space and, therefore, when the recompaction procedure is used in the context of data reconstruction, such storage space reclamation is an added advantage over a typical resilvering only process. The recompaction thread reads the old used data in a data storage chunk and may spread it onto all the non-failed storage drives while writing it out. Because the data is written out at a new location and the old data is no longer needed, it does not require any further resilvering. Another advantage to recompaction is that subchunks from many different chunks can be combined and written out as a single new larger chunk, thus achieving both space and performance efficiency.

Handling of Data for Reconstruction

The policy or scheme as to how the data for reconstruction is handled can be used to drive the effectiveness of the drive utilization process described in reference to FIG. 12. According to an embodiment, for a series or set of data storage chunks corresponding to the data for reconstruction, processing of the data storage chunks alternates between the resilvering procedure and the recompaction procedure on a chunk-by-chunk basis, in parallel. For example, the first chunk being processed may be resilvered according to the resilvering procedure, the next chunk being processed is recompacted according to the recompaction procedure, the next chunk being processed is resilvered according to the resilvering procedure, and so on. While this approach may be relatively simple to implement, the time to completion would be bounded by the slower of the two procedures.

According to an embodiment, a constant queue depth for both the resilvering procedure and the recompaction procedure is maintained. When one of the resilvering and recompaction threads finishes processing its assigned data storage chunks, another chunk is queued to that thread. Thus, this approach allows both procedures to execute in parallel and finish at roughly the same time, however, it does not resilver the minimum data possible.

According to an embodiment, a ratio of the write workload corresponding to the replacement storage drive and the write workload corresponding to the non-failed storage drives is determined. Then according to the determined workload ratio, the data storage chunks corresponding to the first portion of the data is distributed for the resilvering procedure and the data storage chunks corresponding to the remaining portion of the data is distributed for the recompaction procedure, in a manner such that when the write workload corresponding to the non-failed storage drives moves relatively higher then relatively fewer data storage chunks are distributed to the recompacation procedure. For a simple non-limiting example, if the moving average client load on the non-failed drives is twice that of the replacement drive, then approximately one-half fewer chunks may be distributed to the recompaction procedure than the resilvering procedure.

According to an embodiment, the distributing is further based on a statistical distribution corresponding to each storage region and representing the percentage of free storage space available from each of the storage chunks having free storage space available. For example, distributing may be based further on the statistical distribution 1108 (FIG. 11), generated and maintained in constant-time as described elsewhere herein. Hence, this approach is dynamic from multiple perspectives, i.e., based on system workload metrics based on the RAID group information and based on the pool full percentages, which become the starting criteria for the selection of the data storage chunks for recompaction or resilvering.

For a non-limiting example, if a given hard disk drive can perform a maximum 200 MB/s work (read and write combined), in a set of 10+2 RAID6 group, with no I/Os, the replacement drive should get 200 MB/s and the non-failed drives should get equally divided writes. Furthermore, the load on the non-failed drives changes the ratio, which is checked periodically to adapt to the moving average load on the drives. Assuming 50% of the system bandwidth is consumed by the client load, then the maximum resilvering read can be $(n-1)*200/2$ where n is the number of the drives in the RAID group. With recompaction, the reads and the writes are serviced from the same non-failed drives, hence, recompaction gets about net half of the bandwidth. Thus, when the client IO is relatively high, recompaction is scaled back and regular resilvering is performed, so such a scheme may approach an optimal balance in utilizing all the RAID drives.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process operations may be set forth in a particular order, and alphabetic and alphanumeric labels may be used to identify certain operations. Unless specifically stated in the description, embodiments are not necessarily limited to any particular order of carrying out such operations. In particular, the labels are used merely for convenient identification of operations, and are not intended to specify or require a particular order of carrying out such operations.

What is claimed is:

1. A method for reconstructing data stored on a failed storage drive in a redundant array of independent disks (RAID) storage system, the method comprising:
    performing a resilvering procedure on a first portion of the data for reconstruction, comprising:
        reading first redundant data and associated parity, corresponding to the first portion of the data for reconstruction, from one or more non-failed storage drives of the array, and
        sequentially writing the first portion of the data for reconstruction to a replacement storage drive of the array;
    for remaining redundant data corresponding to a remaining portion of the data for reconstruction, performing a recompaction procedure on the remaining redundant data so that each remaining non-failed storage drive of the array writes a portion of the remaining portion to one or more of the non-failed storage drives;
    maintaining a particular number of data storage chunks for processing by the resilvering procedure, which writes to the replacement storage drive, and maintaining a particular number of data storage chunks for processing by the recompaction procedure, which writes to the one or more non-failed storage drives; and
    in response to either of the resilvering and the recompaction procedures finishing processing its data storage chunks, queuing for processing an additional data storage chunk to whichever procedure finished.

2. The method of claim 1, wherein the resilvering procedure and the recompaction procedure execute in parallel.

3. The method of claim 1, wherein performing the recompaction procedure includes each remaining non-failed storage drive writing its portion of the remaining portion in parallel with the other remaining non-failed storage drives.

4. The method of claim 1, wherein for a series of data storage chunks corresponding to the data for reconstruction, alternating between performing the resilvering procedure and the recompaction procedure on a chunk-by-chunk basis.

5. The method of claim 1, further comprising:
    determining a ratio of a write workload corresponding to the replacement storage drive and a write workload corresponding to the non-failed storage drives; and
    distributing data storage chunks corresponding to the first portion of the data for the resilvering procedure and data storage chunks corresponding to the remaining portion of the data for the recompaction procedure according to the ratio, such that responsive to the write workload corresponding to the non-failed storage drives moving relatively higher, then relatively fewer data storage chunks are distributed to the recompaction procedure.

6. The method of claim 5, wherein distributing the data storage chunks for the recompaction procedure is further based on a statistical distribution corresponding to each storage region, of a plurality of physical storage regions each comprising a plurality of data storage chunks, and representing a percentage of free storage space available from each of the storage chunks having free storage space available.

7. A non-transitory processor-readable storage medium storing one or more sequences of instructions for reconstructing data stored on a failed storage drive in a redundant array of independent disks (RAID) storage system, the instructions which, when executed by at least one processing circuit, cause performance of:
    performing a resilvering procedure on a first portion of the data for reconstruction, comprising:
        reading first redundant data and associated parity, corresponding to the first portion of the data for reconstruction, from one or more non-failed storage drives of the array, and
        sequentially writing the first portion of the data for reconstruction to a replacement storage drive of the array; and
    for remaining redundant data corresponding to a remaining portion of the data for reconstruction, performing a recompaction procedure on the remaining redundant data so that each remaining non-failed storage drive of the array writes a portion of the remaining portion to one or more of the non-failed storage drives, wherein the recompaction procedure is based at least in part on a statistical distribution representing a percentage of free space available from each storage chunk having free storage space available from each remaining non-failed storage drive of the array.

8. The storage medium of claim 7, wherein the resilvering procedure and the recompaction procedure execute in parallel.

9. The storage medium of claim 7, wherein performing the recompaction procedure includes each remaining non-failed storage drive writing its portion of the remaining portion in parallel with the other remaining non-failed storage drives.

10. The storage medium of claim 7, wherein for a series of data storage chunks corresponding to the data for reconstruction, alternating between performing the resilvering procedure and the recompaction procedure on a chunk-by-chunk basis.

11. The storage medium of claim 7, wherein execution of the instructions cause further performance of:
    maintaining a particular number of data storage chunks for processing by the resilvering procedure which writes to the replacement storage drive and the particular number of data storage chunks for processing by the recompaction procedure which writes to the one or more non-failed storage drives; and
    in response to either of the procedures finishing processing its data storage chunks, queuing for processing an additional data storage chunk to whichever procedure finished.

12. The storage medium of claim 11, wherein the resilvering procedure and the recompaction procedure execute in parallel.

13. The storage medium of claim 7, wherein execution of the instructions cause further performance of:
    determining a ratio of a write workload corresponding to the replacement storage drive and a write workload corresponding to the non-failed storage drives; and
    distributing data storage chunks corresponding to the first portion of the data for the resilvering procedure and data storage chunks corresponding to the remaining portion of the data for the recompaction procedure according to the ratio, such that when the write workload corresponding to the non-failed storage drives moves relatively higher then relatively fewer data storage chunks are distributed to the recompaction procedure.

14. The storage medium of claim 13, wherein the distributing is further based on a statistical distribution corresponding to each storage region, of a plurality of physical storage regions each comprising a plurality of data storage chunks, and representing a percentage of free storage space available from each of the storage chunks having free storage space available.

15. A system comprising:
  means for performing a resilvering procedure on a first portion of the data for reconstruction, comprising:
    means for reading first redundant data and associated parity, corresponding to the first portion of the data for reconstruction, from one or more non-failed storage drives of the array, and
    means for sequentially writing the first portion of the data for reconstruction to a replacement storage drive of the array; and
  means for performing, for remaining redundant data corresponding to a remaining portion of the data for reconstruction, a recompaction procedure on the remaining redundant data so that each remaining non-failed storage drive of the array writes a portion of the remaining portion to one or more of the non-failed storage drives, wherein the recompaction procedure is based at least in part on a statistical distribution representing a percentage of free space available from each storage chunk having free storage space available from each remaining non-failed storage drive of the array.

16. A method for reconstructing data stored on a failed storage drive in a redundant array of independent disks (RAID) storage system, the method comprising:
  performing a resilvering procedure on a first portion of the data for reconstruction, comprising:
    reading first redundant data and associated parity, corresponding to the first portion of the data for reconstruction, from one or more non-failed storage drives of the array, and
    sequentially writing the first portion of the data for reconstruction to a replacement storage drive of the array;
  for remaining redundant data corresponding to a remaining portion of the data for reconstruction, performing a recompaction procedure on the remaining redundant data so that each remaining non-failed storage drive of the array writes a portion of the remaining portion to one or more of the non-failed storage drives;
  determining a ratio of a write workload corresponding to the replacement storage drive and a write workload corresponding to the non-failed storage drives; and
  distributing data storage chunks corresponding to the first portion of the data for the resilvering procedure and data storage chunks corresponding to the remaining portion of the data for the recompaction procedure according to the ratio, such that when the write workload corresponding to the non-failed storage drives moves relatively higher then relatively fewer data storage chunks are distributed to the recompaction procedure.

17. The method of claim 16, wherein distributing the data storage chunks for the recompaction procedure is further based on a statistical distribution corresponding to each storage region, of a plurality of physical storage regions each comprising a plurality of data storage chunks, and representing a percentage of free storage space available from each of the storage chunks having free storage space available.

18. The method of claim 16, wherein the resilvering procedure and the recompaction procedure execute in parallel.

19. The method of claim 16, wherein performing the recompaction procedure includes each remaining non-failed storage drive writing its portion of the remaining portion in parallel with the other remaining non-failed storage drives.

20. The method of claim 16, wherein for a series of data storage chunks corresponding to the data for reconstruction, alternating between performing the resilvering procedure and the recompaction procedure on a chunk-by-chunk basis.

* * * * *